Figure 1:
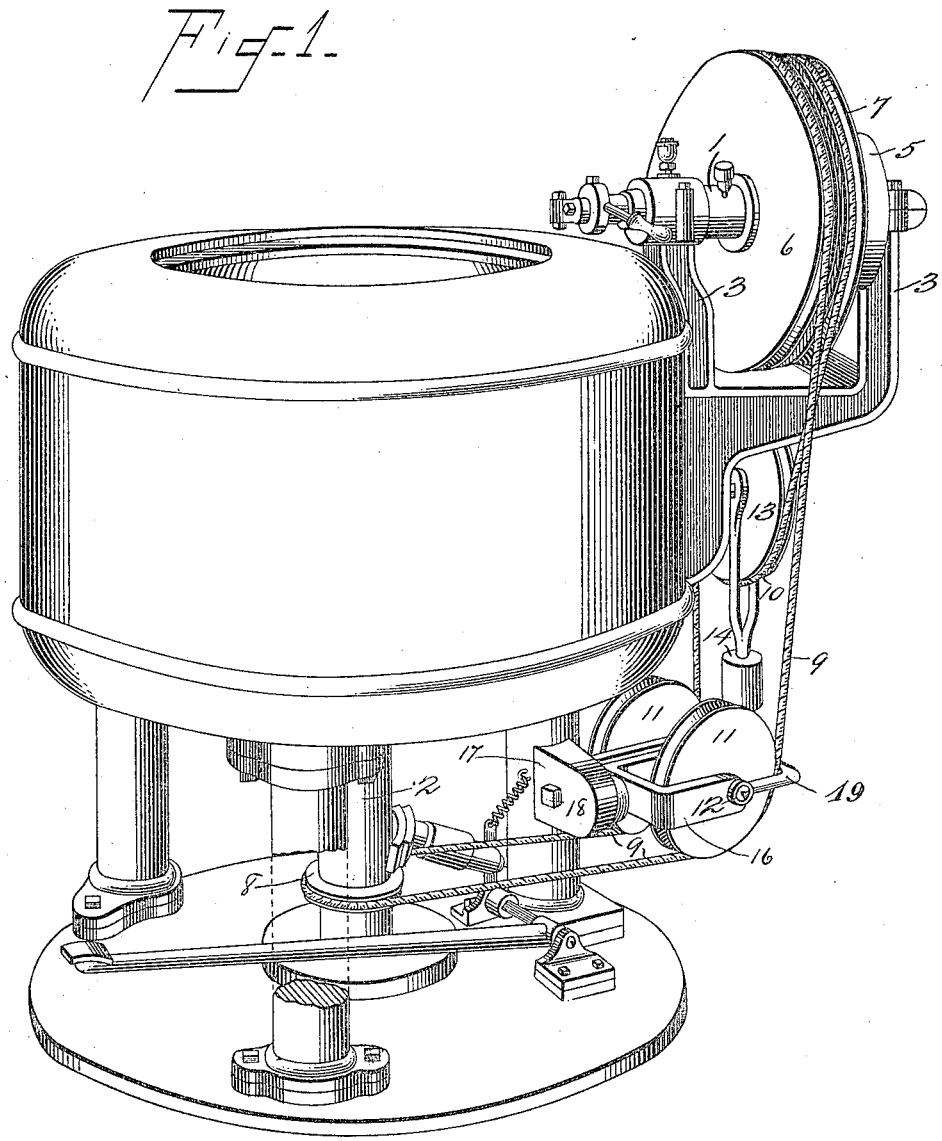

No. 812,703. PATENTED FEB. 13, 1906.
J. T. TRUITT.
BELT GEARING FOR EXTRACTORS.
APPLICATION FILED FEB. 12, 1903.

2 SHEETS—SHEET 1.

J. T. Truitt, Inventor

Witnesses
George Hilton

By H. R. Wilson, Attorney

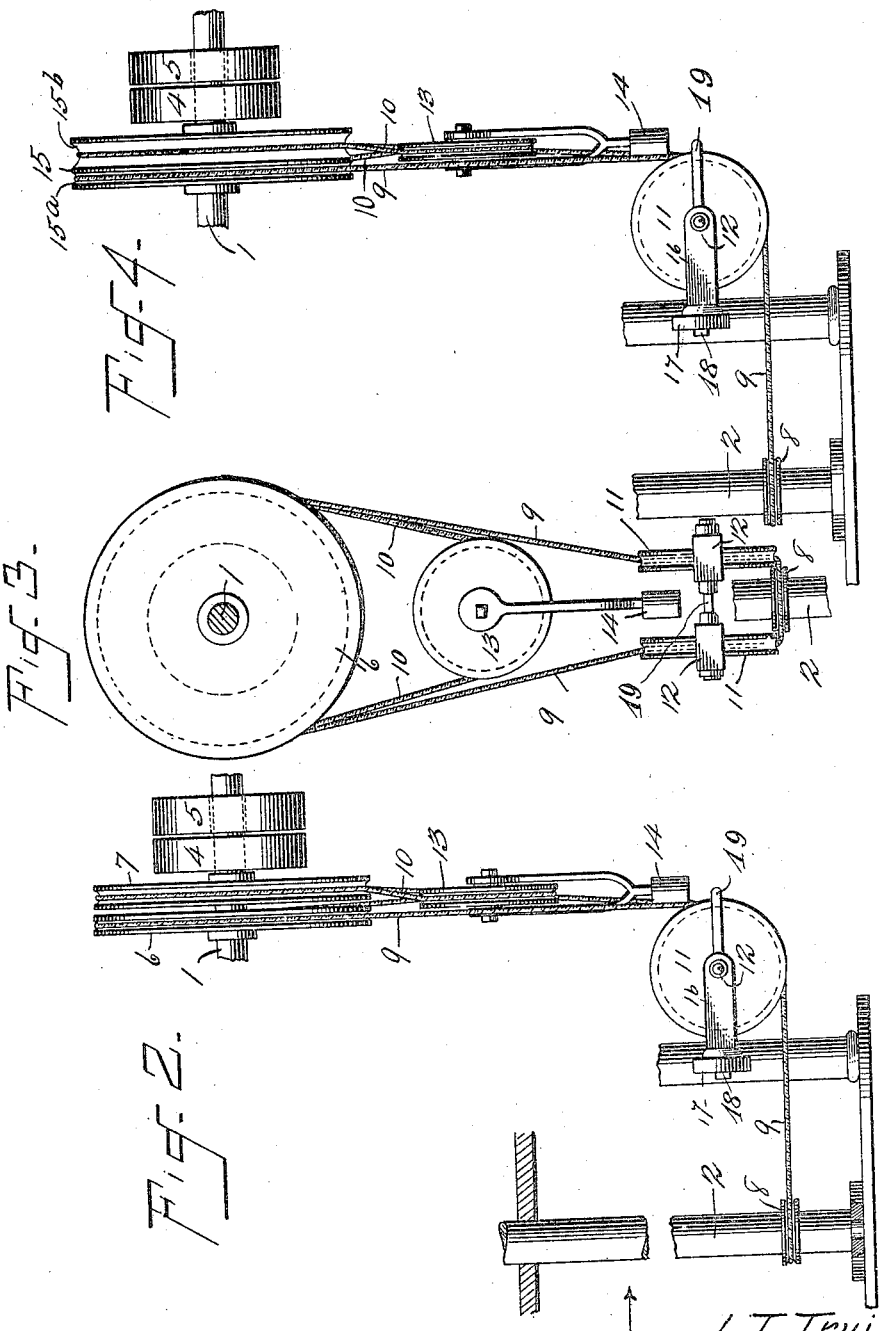

UNITED STATES PATENT OFFICE.

JOHN T. TRUITT, OF ST. LOUIS, MISSOURI.

BELT-GEARING FOR EXTRACTORS.

No. 812,703.　　　　Specification of Letters Patent.　　　Patented Feb. 13, 1906.

Application filed February 12, 1903. Serial No. 143,091.

*To all whom it may concern:*

Be it known that I, JOHN T. TRUITT, a citizen of the United States, residing at St. Louis, in the State of Missouri, have invented certain new and useful Improvements in Belt-Gearing for Extractors; and I do declare the following to be a full, clear, and exact description of the invention, such as will enable others skilled in the art to which it appertains to make and use the same.

My invention is an improved driving-gear especially adapted for connecting the counter-shaft and the driven shaft of that class of laundry machinery known as an "extractor," but also adapted for use in connection with other kinds of machinery; and it consists in the peculiar construction and combination of devices hereinafter fully set forth, and pointed out in the claim.

The object of my invention is to effect improvements in the driving-gear of this class whereby the slack in the flexible driving element or band may be taken up automatically, and thus adapt the driven shaft and counter-shaft to be run at any desired rate of speed and the speed thereof to be varied, as may be required under different conditions.

In the accompanying drawings, Figure 1 is a perspective view of an extractor provided with a driving-gear embodying my improvements. Fig. 2 is a side elevation of one form of my improved driving-gear. Fig. 3 is a similar view at right angles to Fig. 2 looking in the direction of the arrow, the upper bearing and the bracket for supporting the two idle pulleys being omitted and the portion of the frame which is connected with the bracket being broken away. Fig. 4 is a side elevation of a modified form of my improved driving-gear.

In the form of my invention shown in Figs. 1, 2, and 3 the counter-shaft 1, which is at right angles to the driven shaft 2, is journaled in suitable bearings 3 and is provided with a fast drive-pulley 4 and a loose pulley 5 and is also provided with a pair of peripherally-grooved pulleys 6 7, the former being fast to the counter-shaft and the latter being loose thereon. The driven shaft 2 has a pulley 8.
An endless band 9, which is here shown as a rope, connects the pulleys 6, 7, and 8 and is provided with a take-up or compensating bight 10, which depends from the pulleys 6 7, its respective leads depending from opposite sides of said pulleys 6 7. This band engages the grooved peripheries of the respective pulleys, and their leads at points intermediate thereof are engaged by direction-pulleys 11, which have their bearings at 12 in a frame 16. The frame is secured to a suitable support, as a bracket 17, by means of a single bolt 18, which is located at a point between the planes of the two pulleys 11.

A yoke 19 is secured at its ends to the bolt or pivot on which the pulleys 11 are journaled and projects in front of the forward edges of the pulleys to strengthen the frame 16 and assist in preventing the band 9 from being thrown off the pulleys.

An idler-pulley 13 hangs in and is engaged by the bight of the driving-band and is here shown as provided with a weight 14, which depends therefrom. The function of this pulley and the take-up or compensating bight of the endless driving-band is to take up the slack in the latter and enable the counter-shaft and driven shaft to be operated at any desired rate of speed and the speed thereof to be varied as may be required without causing the endless driving-band to slip on the driving or driven pulleys.

A belt may be substituted for the rope band within the scope of my invention, and I do not desire to limit myself in this particular.

In the modified form of my invention (shown in Fig. 4) a single pulley 15 is employed on the counter-shaft in lieu of the pulleys 6 7 and is provided with a pair of peripheral grooves 15ª 15ᵇ for the driving-band, the groove 15ª being of such size as to be closely engaged by the said band and the groove 15ᵇ being of sufficient width to enable the said band to slip thereon.

From the foregoing description, taken in connection with the accompanying drawings, the construction, operation, and advantages of my invention will be readily apparent, it is thought, without requiring a more extended explanation.

Having thus fully described my invention, what I claim as new, and desire to secure by Letters Patent, is—

A belt-gearing for extractors comprising a driving-shaft, a peripheral pulley therewith, a counter-shaft, a fast and a loose pulley thereon, said shaft being also provided with a fast and a loose grooved pulley, a support having a two-part frame provided with a single shaft having thereon a pair of pulleys separately mounted in each part of the frame, a yoke pivoted to the ends of the single shaft and arranged in front of the pulleys on the single shaft, a pulley rotatably mounted in a depending weighted hanger, a driving-band mounted respectively on the pulley of the driving-shaft, the pulleys of the two-part frame, the depending pulley, and also on the grooved pulleys on the counter-shaft, substantially as specified.

In testimony whereof I have hereunto set my hand in presence of two subscribing witnesses.

JOHN T. TRUITT.

Witnesses:
 EMANUEL WEIL,
 J. C. HAINER.